United States Patent
Wan et al.

(10) Patent No.: US 8,692,855 B2
(45) Date of Patent: Apr. 8, 2014

(54) COMPACT ARRANGEMENT OF 3D FILTERS AND OTHER APPARATUS/METHODS OF LIGHTING, RECYCLING, AND DISPLAY

(75) Inventors: Chun Chi Wan, Mountain View, CA (US); Henry Ip, Richmond (CA)

(73) Assignee: Dolby Laboratories Licensing Corporation, San Francisco, CA (US)

(*) Notice: Subject to any disclaimer, the term of this patent is extended or adjusted under 35 U.S.C. 154(b) by 89 days.

(21) Appl. No.: 13/518,755

(22) PCT Filed: Jan. 18, 2011

(86) PCT No.: PCT/US2011/021574
§ 371 (c)(1),
(2), (4) Date: Jun. 22, 2012

(87) PCT Pub. No.: WO2011/094093
PCT Pub. Date: Aug. 4, 2011

(65) Prior Publication Data
US 2013/0127935 A1    May 23, 2013

Related U.S. Application Data

(60) Provisional application No. 61/298,449, filed on Jan. 26, 2010.

(51) Int. Cl.
*G09G 5/02* (2006.01)

(52) U.S. Cl.
USPC ............. 345/697; 345/87; 345/102; 345/204; 345/419

(58) Field of Classification Search
USPC ........... 345/87–102, 204, 208–212, 214, 419, 345/690, 697
See application file for complete search history.

(56) References Cited

U.S. PATENT DOCUMENTS

| | | | |
|---|---|---|---|
| 6,769,772 B2 | 8/2004 | Roddy | |
| 7,001,021 B2 | 2/2006 | Jorke | |
| 2007/0146880 A1 | 6/2007 | Bleha | |
| 2007/0188711 A1 | 8/2007 | Sharp | |
| 2007/0236809 A1 | 10/2007 | Lippey | |
| 2008/0094528 A1* | 4/2008 | Robinson et al. | 349/1 |
| 2009/0103178 A1 | 4/2009 | Woodgate | |
| 2009/0190095 A1 | 7/2009 | Ellinger | |

FOREIGN PATENT DOCUMENTS

WO    2008155367    12/2008

OTHER PUBLICATIONS

Jorke, H., et al., "Stereo Projection Using Interference Filters" Infitec, 2008.
Jorke, H., et al., "INFITEC-A New Stereoscopic Visualisation Tool by Wavelength Multiplex Imaging" 2005.

* cited by examiner

*Primary Examiner* — William Boddie
*Assistant Examiner* — Mansour M Said

(57) ABSTRACT

A compact arrangement of 3D filters is provided by a light source such as an LED and a spectral filter positioned to divide light from the light source into first and second lights having first and second spectral properties. A plurality of the compact sources may be arranged to illuminate (e.g., backlight) a modulator of a display (e.g., an LCD display). The modulator may be configured such that one region is illuminated by the first light and another region is illuminated by the second light (un modulated buffer between regions may be utilized to prevent crosstalk between the regions). The first and second lights are then modulated, for example, according to first and second channels of a 3D display.

29 Claims, 9 Drawing Sheets

Left- and Right-eye Lens at Normal Incidence

COMPACT ARRANGEMENT OF 3D FILTERS AND OTHER APPARATUS/METHODS OF LIGHTING, RECYCLING, AND DISPLAY

CROSS-REFERENCE TO RELATED APPLICATIONS

This application claims priority to U.S. Provisional Patent Application No. 61/298,449 filed 26 Jan. 2010, which is hereby incorporated by reference in its entirety.

TECHNICAL FIELD

The present invention relates to the lighting and display of 3D images.

DISCUSSION OF BACKGROUND

The display of 3D images have been provided by a number of techniques such as, for example, Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventors have realized the need for providing a compact arrangement of spectral filters for 3D projection and techniques/apparatus for backlighting and/or projection of 3D images.

In one embodiment, the invention comprises a compact lighting arrangement comprising a spectral filter, a low power light source configured to provide a first channel of light having only first spectral properties produced by passing light through the spectral filter and a second channel of light having second properties produced by reflecting light off the spectral filter. The low power light source may comprise, for example, a Light Emitting Diode (LED). The light arrangement may be part of a series of similarly constructed lighting arrangements that fit within an enclosure of an LCD display and illuminate one or more regions of the LCD. The first spectral properties may comprise, for example, wavelengths of red, green, and blue.

In another embodiment, the invention may comprise a compact light arrangement comprising a spectral filter, a first light source configured to direct light toward the spectral filter and reflect toward an area of interest, and a second light source configured to direct light toward the spectral filter and pass through the filter to the area of interest. The first light source and the second light source may be energized, for example, in separate and mutually exclusive time periods.

In yet another embodiment, the invention may comprise a lighting arrangement configured to backlight a modulating panel with alternating patterns of light having a first spectra and light having a second spectra complementary and mutually exclusive to the first spectra. The first spectra may produced by a first LED arranged to pass light through a spectral filter and the second spectra may be produced by a second LED arranged to reflect light off of the filter. The first spectra may be produced by a plurality of LEDs each configured to pass light through one of a plurality of spectral filters, and the second spectra may be produced by a plurality of LEDs each configured to reflect light off one of the spectral filters. Each filter may be configured (e.g., via timing of energization of a light source illuminating the filter) to produce first spectra in at least one time period and second spectra in another time period.

In yet another embodiment, the invention may comprise a 3D display comprising a modulating panel, a plurality of light sources, and a plurality of spectral filters each paired with at least one of the light sources and positioned to separate spectra of light emitted from its paired light source into a first spectra having wavelengths consistent with a first-eye channel and a second spectra having wavelengths consistent with a second-eye channel of the 3D display. The plurality of light source spectral filter pairs may be arranged so as to illuminate the modulating panel in a first-eye channel & second-eye channel illumination sequence that corresponds to a first-eye channel & second-eye channel image sequence displayed on the modulation panel such that the spectra of first-eye channel is modulated by the first eye channel image data and the spectra of the second-eye channel is modulated by the second-eye channel image data. The modulating panel may comprise, for example, an LCD display. The modulating panel may comprise, for example, a modulator of a projection system.

Further, in one alternative, the light source—spectral filter pairs are arranged and configured to be energized in a manner that causes a pattern of first-eye channel spectra and second-eye channel spectra to simultaneously illuminate different regions of the modulation panel. The display may be configured such that first-eye channel spectra illuminates a region of the modulating panel energized with a portion of a first-eye channel image and the second-eye channel spectra illuminates a region of the modulating panel energized with a portion of a second-eye channel image. The regions of the modulating panel energized with image data may be separated by at least one region that is not modulated with image data. The regions of the modulating panel energized (or modulated) with image data in one time period may be unmodulated in another time period and visa versa. The energized (or modulated) regions of the modulating panel may vary by at least one of or any combination of position, size, and shape across different time periods. The time periods themselves may also be varied.

The invention may also be embodied as a computer readable media and a set of instructions stored by the computer readable media that, when loaded into a computer, cause the computer to perform the steps of, illuminating a series light sources configured to produce a pattern of right spectra and a pattern of left channel spectra on a modulation panel, energizing portions of the modulation panel matching the pattern of right channel spectra with portions of right channel image data, and energizing portions of the modulation panel matching the pattern of left channel spectra with portions of left channel image data. The modulation panel may be simultaneously energized with the right and left channel image data. In various embodiments, at least one of the spectra produced by each light source may comprise "recycled" "waste" light. The light sources may each comprise, for example, a lighting arrangement comprising an LED and a spectral filter. In one embodiment, each lighting arrangement utilizes only one spectral filter. In another alternative, the light sources may each comprise a first LED positioned to reflect light off a spectral filter to a region of interest and a second LED configured to pass light through the spectral filter to the region of interest.

The above summary provides example embodiments that summarize various portions of the invention. Those examples are not exhaustive as will be apparent to the ordinarily skilled artisan upon review of this disclosure as a whole. Accordingly, the examples provided above and/or elsewhere in this disclosure should not be viewed to limit any part of the invention except as specifically laid out in any claims presented now or in later applications.

Portions of both the devices and methods of the invention as described herein may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s) (or wires), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
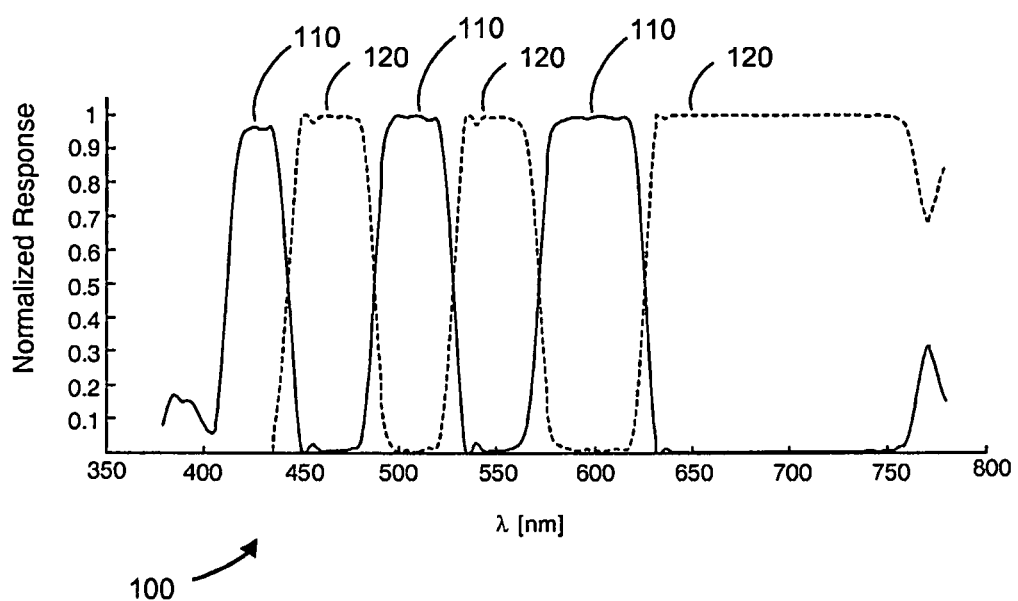
FIG. 1 is a graph illustrating an exemplary reflection and transmission profile of a right eye channel of a spectral separation filter.

Referring now to the drawings, wherein like reference numerals designate identical or corresponding parts, and more particularly to FIG. 1 thereof, there is a graph 100 of a spectral separation filter, including a transmission profile (wavelengths) 110 and a reflection profile (wavelengths) 120. The filter may be constructed using known techniques, which may include layers of optical materials having alternating high and low indexes of refraction placed on a transparent substrate. In one example, filters made by Infitec have previously been used in projectors having transmission and reflective profiles similar to that shown in FIG. 1.

In a 3D projector implementation, using a spectral separation filter as described by FIG. 1 as a right eye channel projection filter, a [substantially] complementary filter may be used for the left-eye channel projection filter. Specifically, in one example embodiment, the complimentary filter for the left-eye channel projection filter would have its transmission and reflection profiles reversed compared to the profiles shown in FIG. 1.

Figure 2:
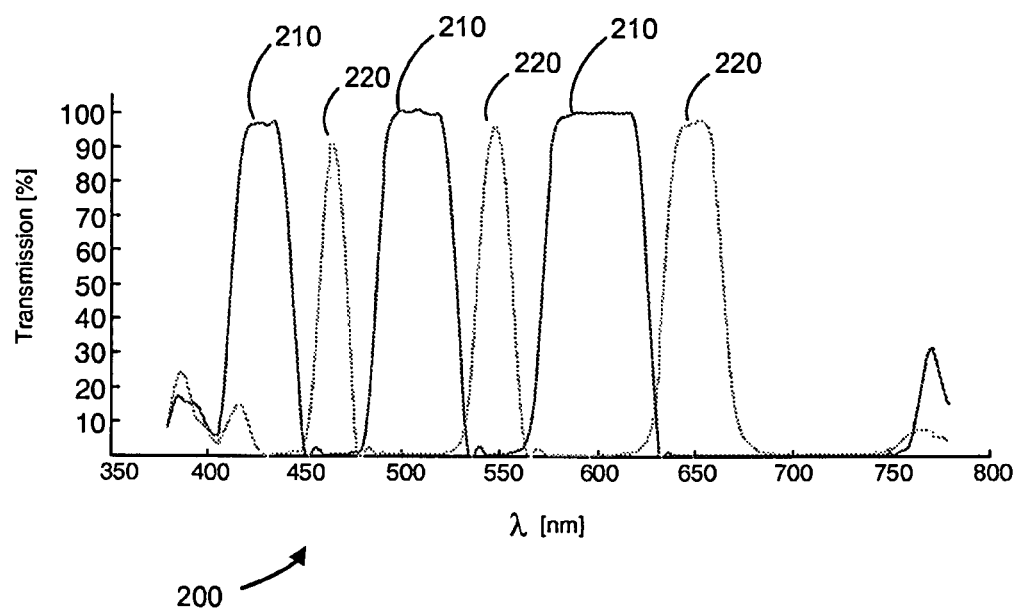
FIG. 2 is a graph illustrating an exemplary transmission profile of left and right eye channels for a pair of 3D viewing glasses.

FIG. 2 is a graph 200 illustrating an exemplary transmission profile of left eye channel viewing filter 210 and a right eye channel viewing filter 220. The viewing filters may be utilized as or on left-eye and right-eye lenses of a pair of 3D viewing glasses. The transmission profiles of glasses may use the same or a similar type of filter technology as the left eye channel and right-eye channel projection filters. The projection filters may be utilized in projectors including cinema, home theater, and other optical devices.

Figure 3:
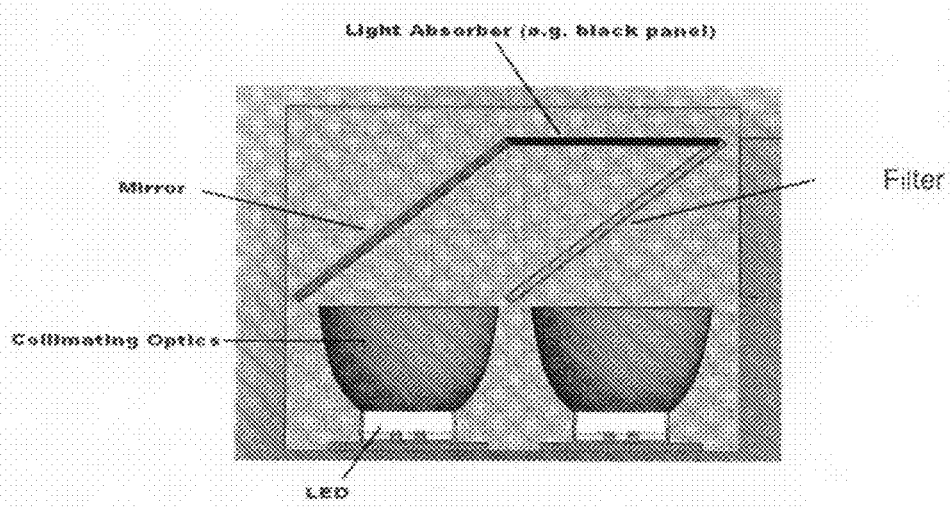
FIG. 3 is a drawing of a compact lighting and spectral separation filter arrangement according to an embodiment of the present invention.

In various embodiments of the invention, projection filters may be arranged in combination with one or more lighting sources to illuminate a screen or modulation panel. FIG. 3 is a drawing of a compact lighting and spectral separation filter arrangement 300 according to an embodiment of the present invention. The arrangement 300 includes dual LEDs, LED 310 and collimating optics 330 that direct light toward mirror 320 and LED 315 directing light toward filter 325. A light absorber 330 absorbs both light from LED 310 reflected off filter 325 and light from LED 315 passed through filter 325.

The arrangement 300 may be utilized, for example, in a backlight form factor for an LCD display. As illustrated, a single filter 325 (e.g., a projection filter having the characteristics of FIG. 1) is sufficient to create spectra for both the left-eye and right-eye channels by operating in a time-multiplexed fashion.

For example, in a first time period, LED 310 is energized to produce light (in combination with filter [325]) having a first set of spectral properties (e.g., illumination for a right-eye channel). In a second time period, LED 315 is energized to produce light having a second set of spectral properties (e.g., illumination of a left-eye channel).

Figure 4:
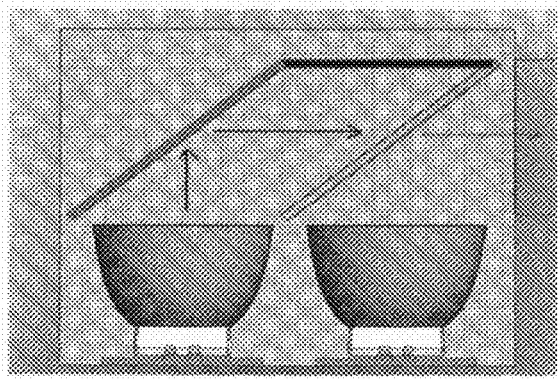
FIG. 4 is a drawing illustrating light propagation for the compact lighting and filter arrangement of FIG. 3 when the Left LED is ON and Right LED is OFF according to an embodiment of the present invention.

FIG. 4 shows light propagation when LED 310 is turned on (energized) and LED 315 turned off. Light (L) rays produced by LED 310 are reflected by mirror 320, the left eye spectra (LES) is then reflected upwards by filter 325 and absorbed into the light absorber 330 (e.g., black panel). Conversely, the right eye spectra (RES) is transmitted through the filter 325, which then enters or is otherwise directed to an area of use (e.g., lightbox cavity of an LCD display, a modulating panel/screen, etc).

Figure 5:
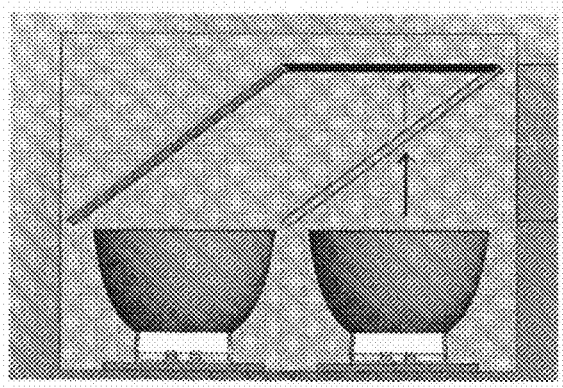
FIG. 5 is a drawing illustrating light propagation for the compact lighting and filter arrangement of FIG. 3 when the left LED is OFF and the right LED is ON according to an embodiment of the present invention.

Similarly, FIG. 5 shows light propagation when the LED 310 is turned off and the LED 315 turned on. Here, continuing with the above example, the right-eye spectra is transmitted through filter 325 and upwards where it is absorbed by light absorber 330. Conversely, the left eye spectra is reflected by the filter 325 and into/towards the desired area of use (e.g., lightbox cavity configured to backlight at least a portion of an LCD display).

In another embodiment, instead of a light absorber, the otherwise unused light/spectra can be "recycled," for example, by redirecting it into a second (or another) area of use (e.g., another region in an optical cavity). An example LED/filter arrangement that may be utilized for "recycling" is shown in FIG. 6, which includes an LED 610, collimating optics 630 and spectral filter 625.

Figure 6:
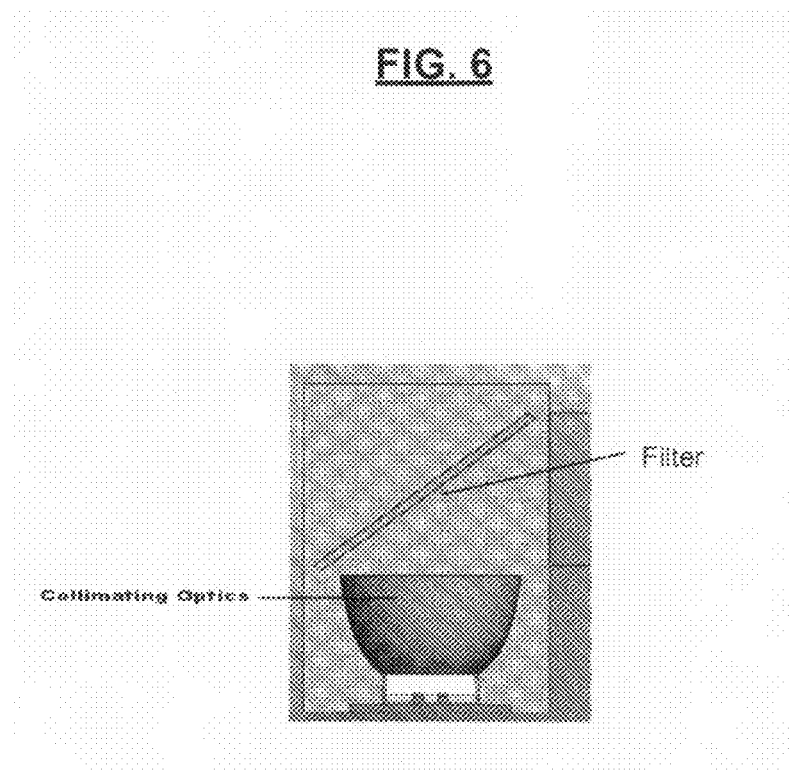
FIG. 6 is a drawing illustrating a light recycling arrangement according to an embodiment of the present invention.
Figure 7:
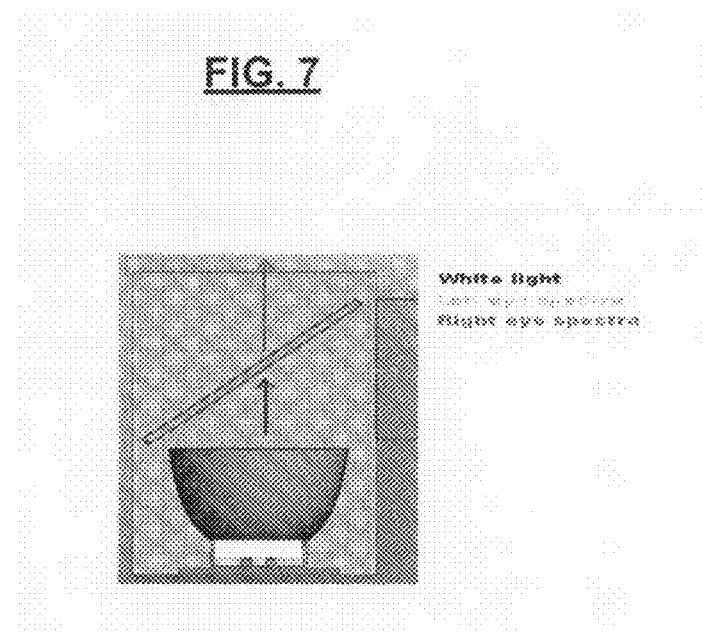
FIG. 7 is a drawing illustrating light propagation in the light recycling arrangement of FIG. 6 according to an embodiment of the present invention.

FIG. 7 shows light propagation in the light recycling arrangement of FIG. 6. Similar to FIG. 5, the left eye spectra (LES) is reflected by filter 625 toward an area of use (e.g., into a region of a lightbox cavity configured to backlight a corresponding region of an LCD panel). Conversely, the right eye spectra (RES) is transmitted upwards and through filter 625 and into another area of use (e.g., another region of the lightbox).

Thus, the present invention includes the use of different regions for illumination where, for example, "recycled" light may be utilized. In one embodiment, a modulator is divided into 2 or more regions of use, each region alternately, and/or in a programmed sequence, being illuminated by light having spectral properties of a first channel and light having spectral properties of a second channel. [The regions of use may also be varied or variable in dimensions with corresponding sequences and area illumination timing implemented by, for example, appropriate LED & filter combination energizations].

Ideally, a mechanism or illumination scheme may be utilized to minimize crosstalk between the regions (minimize or prevent light from one region illuminated by one set of spectra leaking into a region illuminated by another set of spectra.

Figure 8:
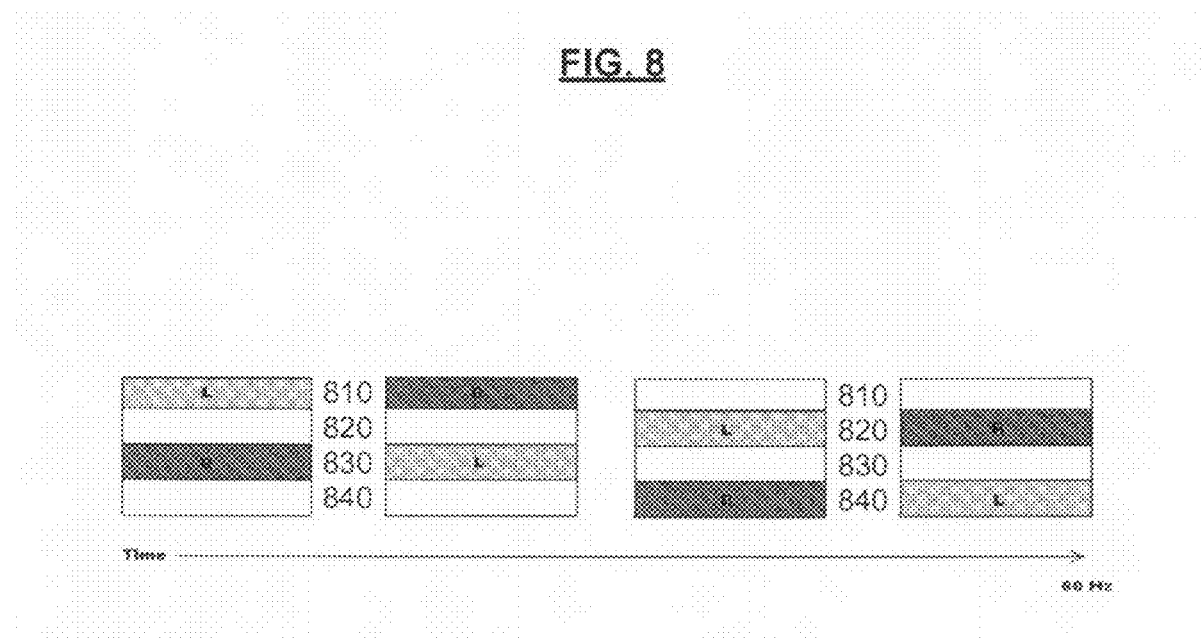
FIG. 8 is a drawing of exemplary lightbox cavity regions that also illustrate a driving technique for a light recycling implementation according to an embodiment of the present invention.

In one embodiment, an optical cavity (e.g., an optical cavity used to illuminate an LCD panel) utilizes at least 4 regions (e.g., regions 810, 820, 830, and 840). FIG. 8 is an example of how the 4 regions can be driven. In a first time period, for example, region 810 may be illuminated by a left channel spectra while region 830 is simultaneously illuminated by a right channel spectra. Corresponding areas of a modulator illuminated by the optical cavity also have similar regions which are simultaneously energized with modulation data comprising a corresponding portions of a left channel image (in a region corresponding to 810) and portions of a right channel image (in a region corresponding to 830).

In the first time period, region 820 is a transition region between left and right channel regions that need not be illuminated (e.g., optical arrangements illuminating region 820 during the first time period may be turned off). In addition, the area of the modulator corresponding to the transition region need not be modulated (e.g., pixels at a set value, closed). An un-modulated end area or other region (e.g., region 840) would be handled similarly. The transition region also serves to minimize crosstalk between the regions illuminated by different spectra.

Alternatively, to smooth the transition region 820, the region may be illuminated with decreasing amounts of light starting with an amount of light of a same spectra and matching or closely matching an intensity of the illumination at the boundary of the neighboring channels but quickly and smoothly extinguishing away from the boundary. Such a lighting arrangement may be utilized with or without a corresponding modulation up until the lighting extinguishes (or meets the opposing channel at very low light level).

Continuing now with the illustrated embodiment, the in a second time frame region 810 is illuminated with right channel spectra and region 830 is illuminated with left channel spectras. Again, the corresponding areas of the modulator are energized with the image data corresponding to the spectra illuminating that area.

In a third time frame, the transition region 820 of the first two time periods is now illuminated with left channel spectra, and the end region 840 of the first two time periods is now illuminated with right channel spectra. Corresponding regions/areas of the modulator are also energized with image data for a channel that utilizes the spectra illuminating those regions/areas. Additionally, region 830 is now a transition region and region 810 has become an end region.

In a fourth time period, the regions swap right channel illumination with left channel illumination, along with corresponding changes in image data energizing the corresponding areas of the modulator. The cycle may then repeat.

By varying the illumination in regions of the optical cavity (and thereby illuminating the modulator) with light comprising both left and right spectra, "waste" light produced by the compact lighting arrangements of the present invention may be "recycled" and utilized to illuminate the display more efficiently. The example illumination scheme of FIG. 8 is but one possible implementation. The areas of illumination and sequence of left or right channel spectra illumination may be varied from that illustrated in FIG. 8. The regions themselves may be varied in size and/or shape, and the sequence of illumination may be varied across time frames and the length of time in each time frame may also be varied. In one embodiment, any one or more of the size, shape, timing, or other attributes of the regions may be adaptively adjusted based on the image data.

To support the implementation of FIG. 8 (and other variations thereof), the modulator (e.g., LCD panel) is preferably capable of a 240 Hz frame rate. Lesser frame rates may see increased flicker or visible artifacts, while greater frame rates may allow for increased flexibility in region size, shape, and/or energization and modulation sequences. On average, over time, the modulation panel is illuminated with equal amounts of left and right channel spectras while modulating areas or regions of the panel with left or right channel image data in synchronization with the illumination of that area or region with corresponding left or right channel spectra.

Figure 9A:
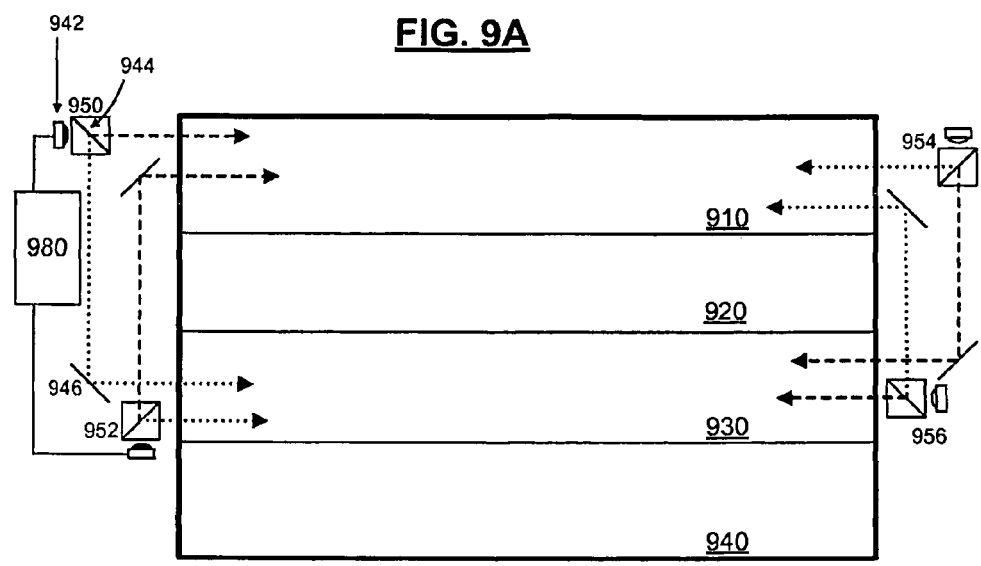
FIG. 9 is an exploded diagram of an exemplary installation of a compact arrangement of 3D filters in a display according to an embodiment of the present invention.
Figure 9B:
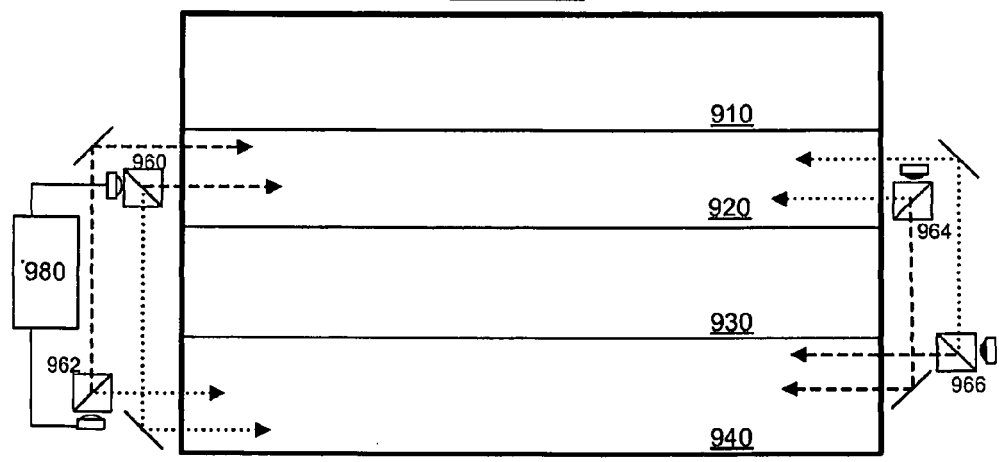

FIGS. 9A and 9B are diagrams of an exemplary implementation of compact arrangements of 3D filters in a display according to an embodiment of the present invention. In this example, a modulation panel 910 is illuminated with an edge lit arrangement of light sources. Each light source illuminates (backlighting in this example) an area/region of the modulation panel 905 (e.g., areas 910, 920, 930 and 940). The light sources are energized by a controller 980 in a manner that causes each area/region (e.g., regions similar to those described in FIG. 8) to be illuminated with an appropriate spectra. The illuminated regions may then be individually modulated with image data that corresponds to the channel that utilizes the illumination spectra. The regions illuminated/modulated may be performed, for example, in a sequence(s) as described with reference to FIG. 8.

Various compact lighting arrangements (e.g., 950) may be utilized to illuminate the modulation panel 905. In one embodiment, the regions are illuminated by energizing an appropriate LED for both the area and to provide the required spectra. In another embodiment, the appropriate LED is energized for the area and "waste" light is recycled by routing it to another area designed to utilize the "waste" spectra.

Specifically, in this example, FIGS. 9A and 9B illustrate an implementation that includes compact lighting arrangements 950/952 and 954/956 for illuminating areas 910 and 930, and compact lighting arrangements 960/962 and 964/966 for illuminating areas 920 and 940.

Compact lighting arrangements each include an LED and spectral filter. For example, compact lighting arrangement 950 comprises an LED 942 and a spectral filter 944. The spectral filter, for example, passes a first-eye channel spectra and reflects a second-eye channel spectra. The LED & spectral filter are positioned such that the first spectras of the lighting arrangements are directed toward an area (or areas) to be illuminated with first spectra, and second spectras are directed toward and area (or areas) to be illuminated with second spectra.

This may be accomplished utilizing various optical arrangements, for example, by maintaining a similar relative orientation of filters/LED/area to be illuminated and using different filters, or, again, as an example, using all the same filters and changing the relative position of the LEDs of the compact lighting arrangements (e.g., 950 compared to 952) such that the passed spectra is directed to an area/areas appropriate for the passed spectra and the reflected spectra is directed to the area/areas appropriate for the reflected spectra.

Compact lighting arrangement 950 passes a first spectra that is directed toward area 910, and reflects a second spectra that is directed toward area 930. A mirror 946 re-directed the reflected spectra toward area 930. Other optical devices including lenses, light guides, diffusers, etc., may be utilized to direct the spectra so that it is transported and distributed (e.g., evenly, algorithmically, etc.) to the area/areas.

Compact lighting arrangements 952, 954, 956, 960, 962, 964, and 956 are similarly arranged so that they illuminate areas of the modulator with appropriate spectra. The timing of the areas to be illuminated and the type of spectra to be illuminated with is determined by the timing of energization of the compact lighting arrangements. For example, to implement the timing scheme illustrated by FIG. 8, the compact lighting arrangements may be energized (by controller 980) according to the sequence described in Table A:

TABLE A

| CLA | Time 1 | Time 2 | Time 3 | Time 4 |
|-----|--------|--------|--------|--------|
| 950 | ON     | OFF    | OFF    | OFF    |
| 952 | ON     | OFF    | OFF    | OFF    |
| 954 | OFF    | ON     | OFF    | OFF    |
| 956 | OFF    | ON     | OFF    | OFF    |
| 960 | OFF    | OFF    | ON     | OFF    |
| 962 | OFF    | OFF    | ON     | OFF    |
| 964 | OFF    | OFF    | OFF    | ON     |
| 966 | OFF    | OFF    | OFF    | ON     |

Many other configurations of the compact lighting arrangement (or other arrangements) may be utilized to produce the desired lighting. Although the present invention has been mainly illustrated and described herein with reference to illuminating one or more regions of an optical cavity of a modulation panel (e.g., LCD display, preferably illuminated by low power LEDs), the devices and processes/methods of the present invention may be applied to other display designs, projectors, and/or any device utilizing multiple channels or lighting of different spectra requirements.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a light cavity, any other equivalent device, or devices capable of similar function, such as, for example, fiber optics, diffusers, direct lighting, whether or not listed herein, may be substituted therewith. Furthermore, the inventors recognize that newly developed technologies not now known may also be substituted for the described parts and still not depart from the scope of the present invention. All other described items, including, but not limited to light sources (e.g., LEDs), filters, filter properties, timing, controllers, varying or variable regional lighting or modulation sequences, etc., should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, energizing sequences of illumination, modulating areas/regions of a modulating panel with image data from different channels (e.g., simultaneously), and the display, storage, or communication of results according to the processes of the present invention.

The present invention may suitably comprise, consist of, or consist essentially of, any of element (the various parts, features, or processes of the invention) and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is

1. A 3D display, comprising: a modulating panel; a plurality of light sources; and a plurality of spectral filters each paired with at least
   one of the light sources and positioned to separate spectra of light emitted from its paired light source into a first spectra having wavelengths consistent with a first-eye channel and a second spectra having wavelengths consistent with a second-eye channel of the 3D display;
   wherein the plurality of light source spectral filter pairs are arranged so as to illuminate the modulating panel in a first-eye channel & second-eye channel illumination sequence that corresponds to a first-eye channel & second-eye channel image sequence displayed on the modulation panel such that the spectra of first-eye channel is modulated by the first eye channel image data and the spectra of the second-eye channel is modulated by the second-eye channel image data; and
   wherein the plurality of light sources are arranged in an edge lit configuration such that the light sources are positioned off an edge of the modulating panel; and
   wherein the first eye channel and second eye channel illumination sequence comprises a sequence illuminating at least four areas on the modulating panel, the sequence comprising,
   illuminating a first area with a first spectra and a third area separate from the first area with a second spectra during a first time interval,
   illuminating the first area with the second spectra and the third area with the first spectra during a second time interval,
   illuminating a second area with the first spectra and a fourth area separate from the second area during a third time interval, and
   illuminating the second area with the second spectra and the fourth area with the first spectra during a fourth time interval.

2. The 3D display according to claim 1, wherein the modulating panel comprises an LCD display.

3. The 3D display according to claim 1, wherein the modulating panel comprises a modulator of a projection system.

4. The 3D display according to claim 1, wherein the light source spectral filter pairs are arranged and configured to be energized in a manner that causes a pattern of first-eye channel spectra and second-eye channel spectra to simultaneously illuminate different regions of the modulation panel.

5. The 3D display according to claim 4, wherein first-eye channel spectra illuminates a region of the modulating panel energized with a portion of a first-eye channel image and the second-eye channel spectra illuminates a region of the modulating panel energized with a portion of a second-eye channel image.

6. The 3D display according to claim 5, wherein the regions energized with image data are separated by at least one region that is not modulated with image data.

7. The 3D display according to claim 6, wherein the regions energized with image data in one time period are unmodulated in another time period and visa versa.

8. The 3D display according to claim 6, wherein the energized regions vary by at least one of or any combination of position, size, and shape across different time periods.

9. The 3D display according to claim 1, wherein each area to be illuminated during a time interval is illuminated by a first light source directed toward the area to be illuminated through a filter passing the spectra for illuminating the area to be illuminated and reflecting spectra not passed by the filter toward the other area to be illuminated in the same time interval.

10. The 3D display according to claim 9, wherein is further configured to illuminate each area to be illuminated by both a direct filtered spectra and a reflected spectra of similar properties.

11. The 3D display according to claim 10, wherein the display comprises four areas configured to be illuminated by at least eight light sources wherein each area comprises a light source directed toward the area to be illuminated and a light source directed toward another area to be illuminated and having spectra re-directed to the area to be illuminated by reflection.

12. The 3D display according to claim 11, wherein the re-direction via reflection comprises a spectral reflection and a second reflection separate from the spectral reflection.

13. The 3D display according to claim 12, wherein the spectral reflection is performed via a beam splitting cube and the second reflection is performed via a mirror each performed off an edge of the modulating panel.

14. The 3D display according to claim 1, wherein the light sources are configured such that light emitted from the light sources is directed in a plane parallel to a plane of the modulating panel.

15. The 3D display according to claim 14, wherein the light sources and filters are configured such that an area of the modulating panel to be illuminated by a first light source is illuminated by light directed through a first eye spectra filter toward the area to be illuminated and reflecting second eye spectra toward another area to be illuminated in the same time interval.

16. The 3D display according to claim 15, wherein the first light spectra and the second light spectra are directed in a plane parallel to a plane of the modulating panel.

17. The 3D display according to claim 1, wherein the light sources comprise LEDs.

18. The 3D display according to claim 1, wherein~of the light sources are operative in anyone time interval.

19. The 3D display according to claim 1, wherein the areas a strips across a face of the modulating panel, and the areas are illuminated by light sources positioned on a first edge during a first time period, and light sources positioned at an opposite edge during a second time period.

20. A 3D projection system, comprising:
a modulating panel;
a plurality of light sources configured to provide spectrally distinct spectras comprising a first spectra having wavelengths consistent with a first-eye channel and a second spectra having wavelengths consistent with a second-eye channel of the 3D projection system;
wherein the plurality of light source spectral filter pairs are arranged so as to illuminate the modulating panel in a first-eye channel & second-eye channel illumination sequence that corresponds to a first-eye channel & second-eye channel image data sequence intended to energize the modulation panel such that the spectra of first-eye channel is modulated by the first eye channel image data and the spectra of the second-eye channel is modulated by the second-eye channel image data; and
wherein the first eye channel and second eye channel illumination sequence comprises a sequence illuminating at least four areas on the modulating panel, the sequence comprising,
illuminating a first area with first spectra and a third area separate from the first area with second spectra during a first time interval,
illuminating the first area with second spectra and the third area with first spectra during a second time interval,
illuminating a second area with first spectra and a fourth area separate from the second area with second spectra during a third time interval, and
illuminating the second area with the second spectra and the fourth area with the first spectra during a fourth time interval.

21. The 3D projection system according to claim 20, wherein the first and third areas are not illuminated during the third and fourth time intervals, and the second and fourth areas are not illuminated during the first and second time intervals.

22. The 3D projection system according to claim 20, wherein the modulating panel comprises a plurality of pixels.

23. The 3D projector system according to claim 20, wherein the illuminations comprise a variable regional lighting.

24. The 3D projector system according to claim 20, wherein the spectras comprise narrowband spectras of less than 50nm full-with at half max.

25. The 3D display according to claim 24, wherein the regions energized with image data are separated by at least one region that is not modulated with image data.

26. The 3D display according to claim 24, wherein the regions energized with image data in one time period are unmodulated in another time period and visa versa.

27. The 3D display according to claim 24, wherein the energized regions vary by at least one of or any combination of position, size, and shape across different time periods.

28. The 3D projector system according to claim 20, wherein the spectras comprise a plurality of narrowband spectras having full-widths at half maximums of less than 50 nm.

29. The 3D display according to claim 1, wherein the energized regions vary by at least one of or any combination of position, size, and shape across different time periods, the spectras comprise narrowband spectras of less than 50 nm full-with at half max, the modulating panel comprises a plurality of pixels, and the illuminations vary so as to comprise a variable regional lighting.

* * * * *